United States Patent [19]

Gray

[11] Patent Number: 4,957,007
[45] Date of Patent: Sep. 18, 1990

[54] BI-DIRECTIONAL PRESSURE SENSING PROBE

[75] Inventor: Lewis Gray, Winter Springs, Fla.

[73] Assignee: Westinghouse Electric Corp., Pittsburgh, Pa.

[21] Appl. No.: 337,075

[22] Filed: Apr. 12, 1989

Related U.S. Application Data

[63] Continuation-in-part of Ser. No. 187,137, Apr. 28, 1988, abandoned.

[51] Int. Cl.$^5$ .............................................. G01F 1/46
[52] U.S. Cl. .................................... 73/861.65; 73/182
[58] Field of Search ................ 73/182, 861.65, 861.66, 73/861.67, 861.68

[56] References Cited

U.S. PATENT DOCUMENTS

| 817,470 | 4/1906 | Cole | 73/861.65 |
| 3,355,946 | 12/1967 | Lazell | 73/861.65 |
| 4,344,330 | 8/1982 | Renken et al. | 73/861.66 |
| 4,823,615 | 4/1989 | Taha | 73/861.66 |

FOREIGN PATENT DOCUMENTS

| 0148062 | 11/1981 | Japan | 73/861.65 |

Primary Examiner—Donald O. Woodiel

[57] ABSTRACT

A pressure sensing probe 10 includes an elliposoidally shaped symmetric probe body 12 with fluid orifices 14 and 16 facing into and away from the flow. The orifices 14 and 16 facing in opposite directions allows direction of flow to be detected along with pressure magnitude. The symmetric body shape allows the probe 10 to operate satisfactorily with some misalignment with respect to the flow direction 32 but perpendicularity between orifices 14 and 16 and the flow direction 32 is preferred. The body 12 is ellipsoidally shaped to maximize the difference in pressure between the two orifices 14 and 16 and is held away from pipe wall turbulence by a symmetric stem 18. The ellipsoidal shape of the body 12 and stem 18 are also designed to minimize turbulence in the fluid created by the probe 10. The length to diameter ratio of the ellipsoidal shape of the probe body 12 changes depending upon fluid density and flow speed and the desires to maximize the pressure signal while minimizing flow disturbance. As the length to diameter ratio is minimized the differential pressure sensed is maximized and as the ratio is maximized flow disturbance is minimized. The orifices 14 and 16 communicate with a conventional differential pressure sensing device 24 outside the pipe through tubes 20 and 22 passing through the body 12 and stem 18. An alternate probe 40 with a greater range of flow direction insensitivity has funnels 50 and 52 which direct flow past orifices 44 and 46 in an internal flow channel 48. A further alternate probe has a solid body 90 suspended from the pressure sensing tubes 98 and 100 with perforations 102 in the tubes 98 and 100 at the juncture of the tubes 98 and 100 and the body 90.

4 Claims, 3 Drawing Sheets

BI-DIRECTIONAL PRESSURE SENSING PROBE

CROSS REFERENCE TO RELATED APPLICATION

This application is a Continuation-In-Part of U.S. application No. 07/187,137 filed Apr. 28, 1988 by Lewis Gray, now abandoned.

BACKGROUND OF THE INVENTION

1. Field of the Invention

The present invention is directed to a bi-directional pressure sensing probe for measuring fluid flow in a pipe and, more particularly, to a probe that indicates flow direction as well as maximizes the pressure signal produced by the probe and/or minimizes flow disturbance created by the probe.

2. Background of the Invention

In many applications it is important to know not only the magnitude of fluid flow in a pipe but also the direction. Reverse direction flow can sometimes damage very expensive equipment. One such application is a steam generator steam extraction line. Reverse flow in this line can be accompanied by the reverse flow of liquid rather than steam. Reverse water flow in a steam turbine can be very damaging. Monitoring reverse flow conditions in extraction lines is very important. Prior art pressure sensors determine static pressure in fluid pipes by positioning the pressure sensing orifice in the pipe wall with the orifice opening parallel to the pipe wall and to the flow in the pipe. Measurements of the fluid flow in these pipes by the use of this type of pressure sensing element generally relies on the detection of pressure at two different physical locations that have different local flow conditions. The detection of pressure at one location, along with the pressure differential between the two locations, is sufficient to determine the mass flow, if the fluid temperature, standard properties and local flow conditions at the two locations are known. Measured relationships adjusted by empirical correction coefficients are used to express the flow in terms of the two pressures. The mass flow is, to a first approximation, proportional to the square root of the pressure differential. These prior art sensors do not provide information concerning flow direction and also measure static pressure in an area where wall turbulence can cause inaccuracies in the measurements. Other prior art devices include two orifices one of which faces into the flowing fluid and the other faces away from the flowing fluid. Examples of such devices can be found in U.S. Pat. Nos. 3,355,946 and 4,715,232 and Japanese Pat. application Kokai No. 56-148062. Of these devices none are designed to maximize the pressure differential between the orifices or to minimize any flow disturbance created by the device.

SUMMARY OF THE INVENTION

It is an object of the present invention to provide a probe that will sense flow pressure in opposite flow directions and will indicate the flow direction along with the pressure.

It is another object of the present invention to provide a probe that minimally disturbs fluid flow.

It is a further object of the present invention to provide a probe that maximizes the value or magnitude of the pressure signal produced by the probe.

It is also an object of the present invention to provide a probe that is simple in construction and reliable during service.

It is still another object of the present invention to provide a sensor with an increased pressure differential signal.

It is an additional object of the present invention to provide a probe which is positioned away from pipe wall turbulence.

The above objects can be attained by a pressure sensing probe that includes a symmetric probe body with fluid orifices facing into and away from the flow. The body can be ellipsoidally shaped to maximize the difference in pressure between the two orifices and is positioned away from pipe wall turbulence. The shape of the body and stem can also be designed to minimize turbulence in the fluid created by the probe. The orifices communicate with a differential pressure sensing device which may be outside a pipe through tubes passing through the body and the stem.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
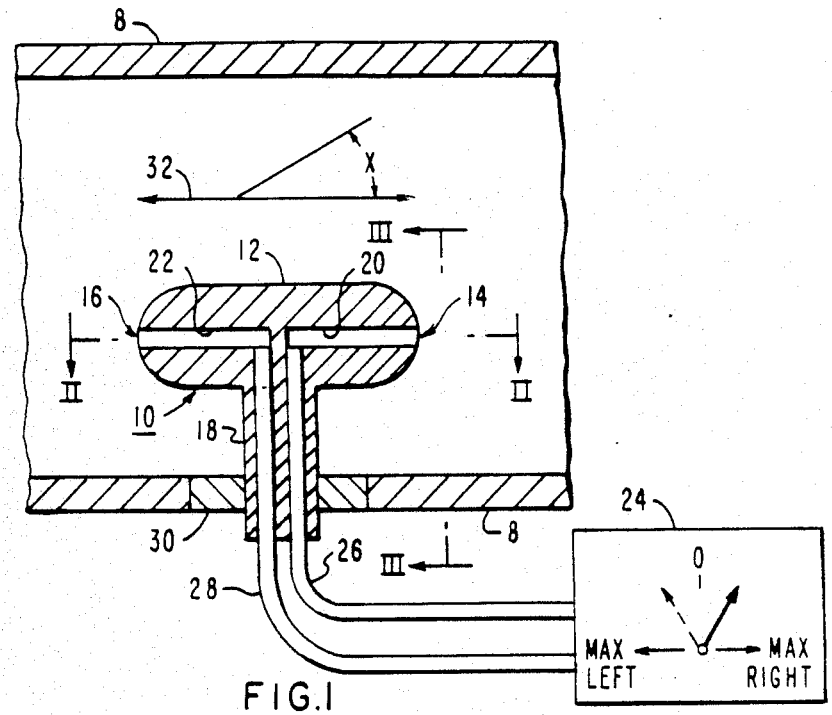
FIG. 1 is a side sectional view of one embodiment of a pressure sensing probe 10 according to the present invention.

The pressure sensing element or probe 10 of the present invention projects inward from a pipe wall 8 as illustrated in FIG. 1. The probe body 12 includes two orifices 14 and 16 at two locations such that the probe geometry is symmetric with respect to the forward and rearward facing ends. The location of the orifices 14 and 16 is generally at each end of the probe body 12 such that the pressure at the upstream orifice approximates pure or stagnation pressure and at the downstream orifice approximates free-stream static pressure conditions or below. The shape of the probe body 12 is designed to maximize the pressure difference between the two orifices 14 and 16, thereby maximizing pressure signal sensitivity while simultaneously minimizing flow disturbance effects for different fluid densities, flow speeds and locations. When a pressure below static pressure (essentially a vacuum) can be created at the downstream orifice by appropriate design of the body 12, the differential pressure that can be measured increases in range providing a probe 10 that is more sensitive to pressure changes because the differential signal is larger. Appropriate body 12 design for a particular fluid density and flow conditions can increase sensitivity while minimizing creation of turbulence. A different shape than that illustrated in FIG. 1 will be needed to maximize the pressure signal while minimizing the created turbulence for different flow conditions. The pressure sensing probe 10 particularly illustrated in FIG. 1 is designed to measure steam generator steam pressure and the reader is referred to *Fluid-Dynamic Drag* by S.F. Hoerner, published 1965 by Hoerner Fluid Dynamics, Brick Town, NJ, particularly chapter 3, incorporated by reference herein for design considerations, parameters and guidelines for designing a probe body 12 for a particular flow speed and fluid density.

The probe body 12 is held away from the pipe wall 8 by a stem 18 through which pressure tubes 20 and 22 pass. The stem holds the probe body 12 and orifices 14 and 16 away from the turbulent flow region created by the pipe wall 8. A suitable distance away from the wall 8 in a steam generator pipe is twenty percent of body diameter. The pressure transmission tubes 20 and 22 in the probe 10 conduct the fluid pressures, through tubes 26 and 28 to a conventional bi-directional differential pressure sensing device 24 that shows not only pressure values but direction. The tubes 26 and 28 can be any type which will withstand the maximum expected pipe pressure. An appropriate sensing device 24 is a conventional differential pressure gauge with a modified front face showing pressure direction. The stem 18 is surrounded at its interface with the pipe wall 8 by an appropriate seal 30 that fits flush with the pipe wall 8. The seal 30 must be large enough to allow the probe 10 to be inserted through a hole in the pipe wall 8. A conventional tapered screw fitting seal 30 is appropriate. The probe body 12 and stem 18 can be made of a suitable corrosion resistant substance such as stainless steel which will withstand the bending moment created by the fluid on the probe 10.

Figure 2:
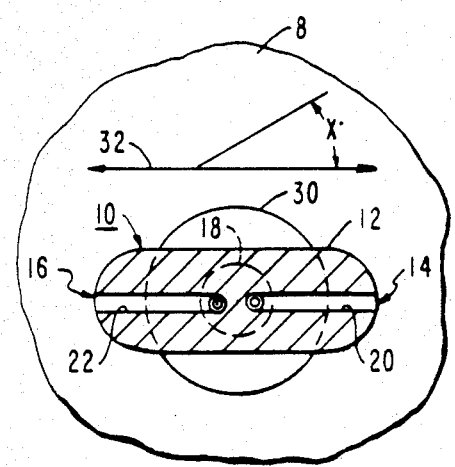
FIG. 2 is a top sectional view of the probe 10 of FIG. 1 along the line II—II.

The double headed arrow 32 in FIGS. 1 and 2 indicates fluid flow direction through the pipe 8. The orifices 14 and 16 must face into and away from the fluid flow such that the orifice openings are substantially perpendicular to the flow direction. FIG. 2 is a top sectional view along the lines II—II in FIG. 1. The orifices 14 and 16 do not have to be absolutely perpendicular to the fluid flow direction 32 but can be misaligned with respect to the fluid flow direction within an allowable misalignment angle X of up to about 20° without resulting in substantial changes in the pressure differential signal.

Figure 3:
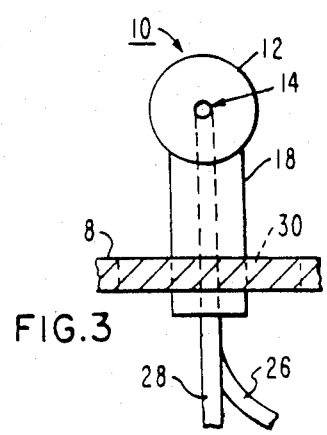
FIG. 3 is an end sectional view of the pressure sensing probe 10 of FIG. 1 along the line III—III.

FIG. 3 is an end view of the probe 10 along the line III—III in FIG. 1 with the fluid flow direction being into and out of the page. FIGS. 1–3 show a cylindrical stem 18, however, it is possible for the stem 18 to have a streamlined shape such as an ellipse.

Figure 4:
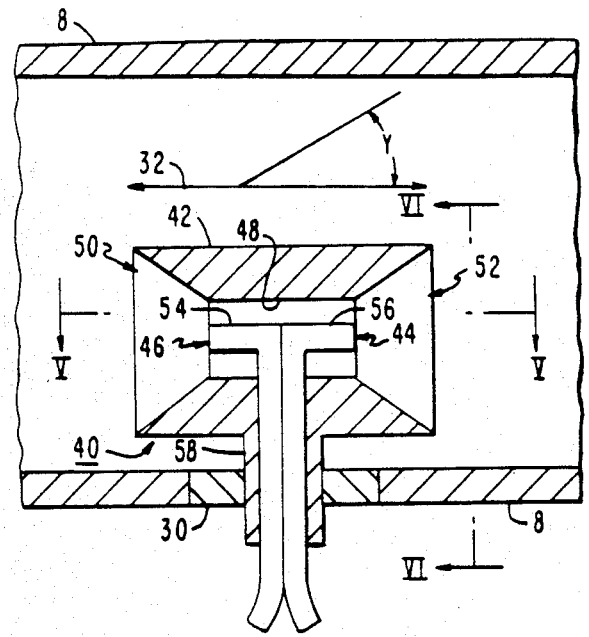
FIG. 4 is a side sectional view of a second embodiment of a pressure sensing probe 40 in accordance with the present invention.

FIG. 4 illustrates a second embodiment of a probe 40 in accordance with the present invention. This probe 40 has a probe body 42 with internally located orifices 44 and 46. The orifices 44 and 46 are positioned in an internal flow channel 48 through which fluid flows through the body 42. This probe 40 provides improved sensitivity to non-axial flow directions since it directs the fluid into the probe body 42 and channel 48 through a funnel shaped inlet 50 and allows fluid to exit through a symmetrically shaped flow outlet 52. The orifices 44 and 46 communicate with pressure transmission tubes 54 and 56 which pass through the probe body 42 and a probe stem 58. The allowable misalignment angle Y by which the probe 40 ends can be misaligned with the flow direction 32 can be as great as 30°.

Figure 5:
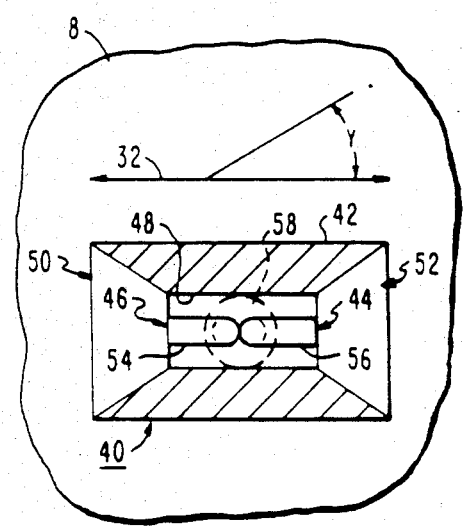
FIG. 5 is a top sectional view of the probe 40 in FIG. 4 along the line V—V.

FIG. 5 is a top cross-sectional view along the line V—V in FIG. 4. This view shows the orifices 44 and 46 positioned exactly at the narrow ends of the respective funnels 48 and 50, however, it is possible to position the orifices 44 and 46 in the funnels 48 and 50 or further recessed in the body 42.

Figure 6:
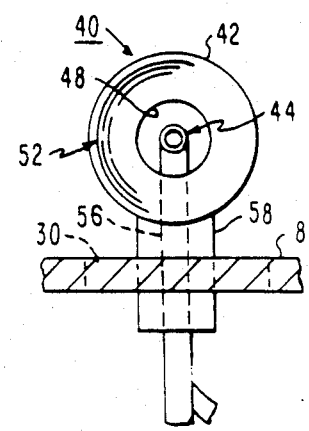
FIG. 6 is an end view of the probe 40 in FIG. 4 along the line VI—VI.

FIG. 6 is an end view along the line VI—VI of the probe 40 of FIG. 4. This probe 40 should also be made of a non-corrosive substance such as stainless steel when used in a steam generator. The probe 40 of FIGS. 4–6 is shown with angular intersections between faces of the funnels 48 and 50 and the interior flow channel 48, however, a curved surface as in a cylindrical funnel and cylinder can be used.

Figure 7:
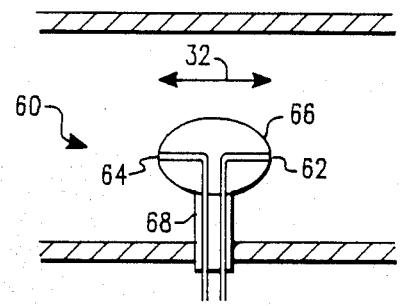
FIG. 7 is a side sectional view of a third embodiment of a pressure sensing probe 60 which minimizes flow disturbances in accordance with the present invention.

To further maximize the differential pressure detected by the probe 60 between the orifices 62 and 64 while also minimizing flow disturbance, an ellipsoidal probe body 66 should be provided as illustrated in FIG. 7. In this embodiment the body length in the direction of flow is substantially greater than the diameter perpendicular to the flow direction. A view from the top of this probe 60, although not shown, would illustrate that the probe body is symmetric presenting an ellipsoidal aspect when viewed from the top, that is, the ellipsoidal body has its axis of revolution coincident with the flow axis. This probe 60 is intended for applications where maximum pressure differential with the least flow disturbance is required. To further minimize flow disturbance the probe stem 68 should be streamlined. A length to diameter ratio of about not more than 1.5 would be appropriate to maximize the pressure differential signal while minimizing the flow disturbance.

Figure 8:
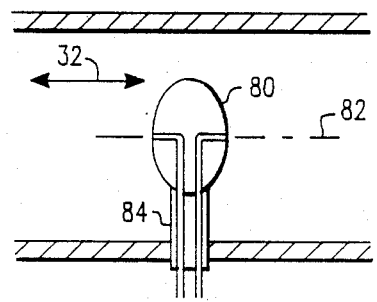
FIG. 8 is a side sectional view of a fourth embodiment of a pressure sensing probe 80 which maximizes the differential pressure signal in accordance with the present invention.

To create the highest differential pressure the symmetrical ellipsoidal probe body 80, as illustrated in FIG. 8, should have a length along the probe body axis 82 in the direction of flow substantially smaller than the probe body diameter perpendicular to the flow. To maximize the differential pressure the ratio of body length to body diameter needs to be minimized. A length to diameter ratio no greater than 0.5 would be appropriate. In this embodiment the flow disturbance is kept to a minimum by a streamlined stem 84.

Figure 9:
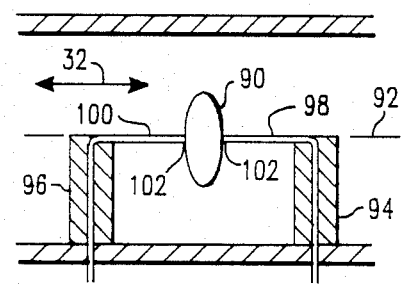
FIG. 9 is a side sectional view of a modification of the embodiment of FIG. 8.
Figure 10:
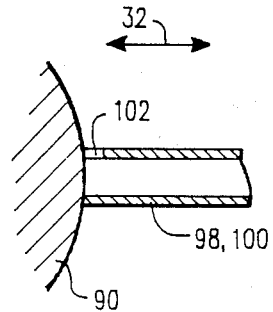
FIG. 10 is a detailed view of a portion of the embodiment of FIG. 9.

FIG. 9 illustrates an alternate embodiment in which the body length-diameter ratio is minimized in a symmetric ellipsoidal probe body 90 in which the body length is substantially smaller than body diameter. A length to diameter ratio no greater than 0.25 appears appropriate. The solid body 90 increases the differential pressure by effectively creating a vacuum or pressure below static pressure on the rearward side of the body 90 in the direction of flow along the body axis 92. In this embodiment, streamlined probe stems 94 and 96 are provided separate from the probe body and pressure sensing tubes 98 and 100 support or suspend the body away from the stems 94 and 96. The distance between the stems 94 and 96 and the body 90 depends on the fluid forces on the probe. Approximately 0.5 to 1.0 of probe body diameter is considered appropriate for this distance. This arrangement promotes the minimization of aerodynamic interference between the probe body 90 and the probe stems 94 and 96 which would otherwise cause asymmetry in the flow about the probe body 90 leading to less than optimum pressure sensing ability. This configuration also eliminates the mechanical stress due to bending at the probe body to stem junction created by the short body length of the probe of FIG. 8. The pressure sensing orifices 102 in the tubes 98 and 100 are either small openings or part circumferential slots next to the body 90 as illustrated in FIG. 10. These openings are created by locally perforating the tubes 98 and 100 at the juncture with the probe body 90.

The ellipsoidal probe body allows the designer to optimize the pressure differential and minimize flow disturbance for a particular application. The combined requirement of maximizing the pressure differential and minimizing the flow disturbance leads to a conflict in the choice of probe body length and diameter since minimizing flow disturbances generally requires that the body length to diameter ratio be increased while maximizing pressure generally requires that the ratio be minimized. The optimum choice of the ratio will depend on the need to maximize the differential pressure signal for a given application. The choice of the ratio can change the magnitude of the differential pressure signal by a factor of up to approximately two. This is significant for applications where low pressure signal levels are expected. The ellipsoidal body of the probe allows the designer to trade off these factors while generating a higher pressure signal and minimizing flow disturbance as compared to prior art probes of the spherical and venturi type.

The many features and advantages of the present invention are apparent from the detailed specification and thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and, accordingly, all suitable modifications and equivalents may be resorted to, falling within the scope of the invention

I claim:

1. A bi-directional pressure sensing probe sensing fluid flow, comprising:
    a first orifice facing into the flow;
    a second orifice facing away from the flow; and
    a probe body comprising:
        differential means for maximizing a pressure differential between said first and second orifices and comprising said probe body having an ellipsoidal shape; and
        positioning means for positioning said first and second orifices in a laminar region of the flow, said positioning means comprising:
        first and second streamlined stems; and
        first and second pressure sensing tubes attached to and suspending said body away from said stems.

2. A probe as recited in claim 1, wherein said tubes are perforated at a juncture between said tubes and said body.

3. A bi-directional pressure sensing probe for measuring flow in a steam generator pipe having a wall, said probe comprising:
    a symmetric ellipsoidal probe body having a body length along a flow axis substantially smaller than body diameter perpendicular to the flow axis;
    a first orifice in a first end of said body facing into the flow and oriented within an alignment angle range with respect to the flow;
    a second orifice in a second end of said body facing away from the flow and oriented within an alignment angle range with respect to the flow;
    a streamlined body stem coupled to said body and holding said body away from the pipe wall; and
    first and second tubes coupled to said first and second orifices passing through said body and said stem.

4. A bi-directional pressure sensing probe for measuring flow in a steam generator pipe having a wall, said probe comprising:
    a symmetric ellipsoidal probe body having a body length along a flow axis substantially larger than body diameter perpendicular to the flow axis;
    a first orifice in a first end of said body facing into the flow and oriented within an alignment angle range with respect to the flow;
    a second orifice in a second end of said body facing away from the flow and oriented within an alignment angle range with respect to the flow;
    a streamlined body stem coupled to said body and holding said body away from the pipe wall; and
    first and second tubes coupled to said first and second orifices passing through said body and said stem.

* * * * *